US009424649B1

(12) United States Patent
Tanaka

(10) Patent No.: US 9,424,649 B1
(45) Date of Patent: Aug. 23, 2016

(54) MOVING BODY POSITION ESTIMATION DEVICE AND MOVING BODY POSITION ESTIMATION METHOD

(71) Applicant: Nissan Motor Co., Ltd., Yokohama-shi, Kanagawa (JP)

(72) Inventor: Shinya Tanaka, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/031,295

(22) PCT Filed: Sep. 5, 2014

(86) PCT No.: PCT/JP2014/073432
§ 371 (c)(1),
(2) Date: Apr. 22, 2016

(87) PCT Pub. No.: WO2015/072217
PCT Pub. Date: May 21, 2015

(30) Foreign Application Priority Data

Nov. 13, 2013 (JP) .................. 2013-234516

(51) Int. Cl.
*G06K 9/00* (2006.01)
*G06T 7/00* (2006.01)
*G06T 7/20* (2006.01)
*G06K 9/46* (2006.01)
*G06F 1/16* (2006.01)
*G06F 3/01* (2006.01)
*G06T 1/00* (2006.01)

(52) U.S. Cl.
CPC ........... *G06T 7/0044* (2013.01); *G06K 9/4604* (2013.01); *G06T 7/0085* (2013.01); *G06T 7/204* (2013.01); *G06F 1/163* (2013.01); *G06F 3/012* (2013.01); *G06K 9/00671* (2013.01); *G06T 1/0007* (2013.01); *G06T 2207/10016* (2013.01); *G06T 2207/10028* (2013.01); *G06T 2207/30241* (2013.01); *G06T 2207/30252* (2013.01)

(58) Field of Classification Search
CPC ... G06T 7/0044; G06T 7/0085; G06T 7/204; G06T 2207/30241; G06T 2207/30252; G06T 2207/10028; G06T 1/0007; G06T 2207/10016; G06K 9/4604; G06K 9/00671; G06F 1/163; G06F 3/012
See application file for complete search history.

(56) References Cited

U.S. PATENT DOCUMENTS

| 2009/0244062 | A1* | 10/2009 | Steedly | G06T 7/0061 345/420 |
| 2009/0262113 | A1* | 10/2009 | Kotake | G02B 27/017 345/427 |
| 2010/0289632 | A1* | 11/2010 | Seder | G01S 13/723 340/436 |

(Continued)

FOREIGN PATENT DOCUMENTS

| JP | 2009-252112 A | 10/2009 |
| JP | 2010-60451 A | 3/2010 |
| JP | 2013-186551 A | 9/2013 |

*Primary Examiner* — Stephen R Koziol
*Assistant Examiner* — Jonathan S Lee
(74) *Attorney, Agent, or Firm* — Global IP Counselors, LLP

(57) ABSTRACT

An evaluation value calculation unit is configured to compare an edge image and virtual image for each particle, assigns a higher evaluation value if there are more overlapping edges between the images, and assigns a higher evaluation value if there are more edges that are not overlapping edges and for which an edge-to-edge distance, which is the distance between an edge in the edge image and an edge in the virtual image, is less than or equal to a prescribed value. A position and orientation estimation unit is configured to estimate the position of a vehicle based on the evaluation value for each particle.

7 Claims, 8 Drawing Sheets

(56) References Cited

U.S. PATENT DOCUMENTS

2013/0128012 A1* 5/2013 Turner .................... G06F 3/011
                                                    348/53
2013/0202197 A1* 8/2013 Reeler .................... G01S 17/89
                                                    382/154
2014/0362193 A1* 12/2014 Kanetake ........... H04N 13/0221
                                                     348/50
2015/0302549 A1* 10/2015 Hiroi .................... H04N 9/3179
                                                    382/296

* cited by examiner

MOVING BODY POSITION ESTIMATION DEVICE AND MOVING BODY POSITION ESTIMATION METHOD

This application is a U.S. National stage application of International Application No. PCT/JP2014/073432, filed Sep. 5, 2014, which claims priority to Japanese Patent Application No. 2013-234516 filed in the Japan Patent Office on Nov. 13, 2013, the contents of each of which is hereby incorporation herein by reference.

BACKGROUND

1. Field of the Invention

The present invention relates to a moving body position estimation device and a moving body position estimation method.

2. Background Information

In Japanese Laid-Open Patent Application No. 2010-60451, a matching of the edges between an edge image generated from an image captured by a camera and a virtual image generated from a known three dimensional map using a particle filter is carried out for each particle, and a position of a moving body is stochastically estimated from a likelihood distribution, in which the likelihood is increased, as the amount of overlapping edges is increased, and the likelihood is decreased, as the amount of overlapping edges is decreased.

SUMMARY

However, in the prior art described above, since the likelihood is calculated based on the degree of overlapping of the edges, even if the parameter of the particle is close to the true position of the moving body, if the parameter of the position of the particle is even slightly shifted from the true position, there is the problem that the likelihood of the particle is extremely reduced, causing the estimation to become unstable.

The object of the present invention is to provide a moving body position estimation device and a moving body position estimation method that can stably estimate the position of a moving body.

In the present invention, an edge image and a virtual image for each particle are compared, a higher evaluation value is assigned if there are more overlapping edges between the images, and a higher evaluation value is assigned if there are more edges that are not overlapping edges and for which an edge-to-edge distance, which is the distance between an edge in the edge image and an edge in the virtual image, is less than or equal to a predetermined value.

Therefore, the position of a moving body can be stably estimated.

BRIEF DESCRIPTION OF THE DRAWINGS

Referring now to the attached drawings which form a part of this original disclosure.

DETAILED DESCRIPTION OF THE EMBODIMENTS

Selected embodiments will now be explained with reference to the drawings.

First Embodiment

Figure 1:
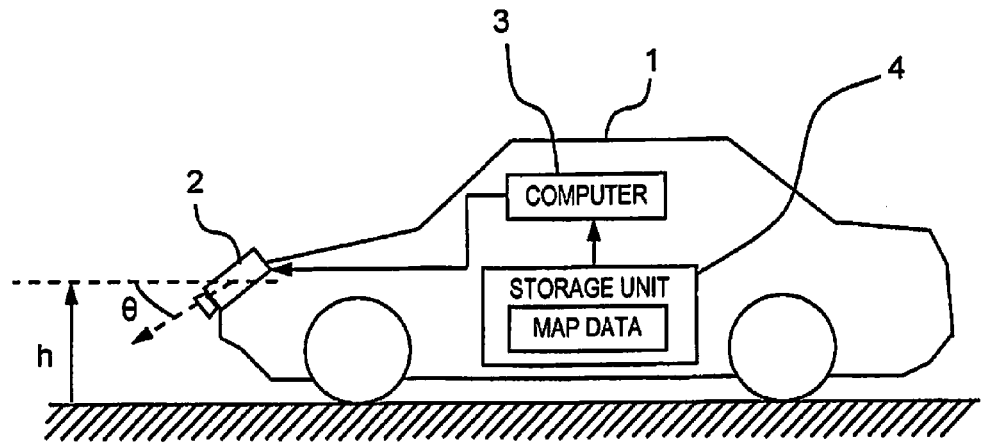
FIG. 1 is a block diagram of a moving body position estimation device in accordance with a first embodiment.

FIG. 1 is a block view of the moving body position estimation device of the first embodiment. A vehicle 1 comprises a camera (image capturing means) 2, a computer 3, and a storage unit (storing means) 4. The camera 2 is attached at a front end portion of the vehicle 1, at a height of h, at 0 degrees downward from horizontal, and captures images of the region on the front side of the vehicle 1. The computer 3 carries out a matching step between the map data stored in the storage unit 4 and the images captured by the camera 2, and estimates the position and orientation of the vehicle 1. The storage unit 4 stores a three dimensional map data comprising edge information and position information of structures existing in the surroundings of the vehicle 1.

Figure 2:
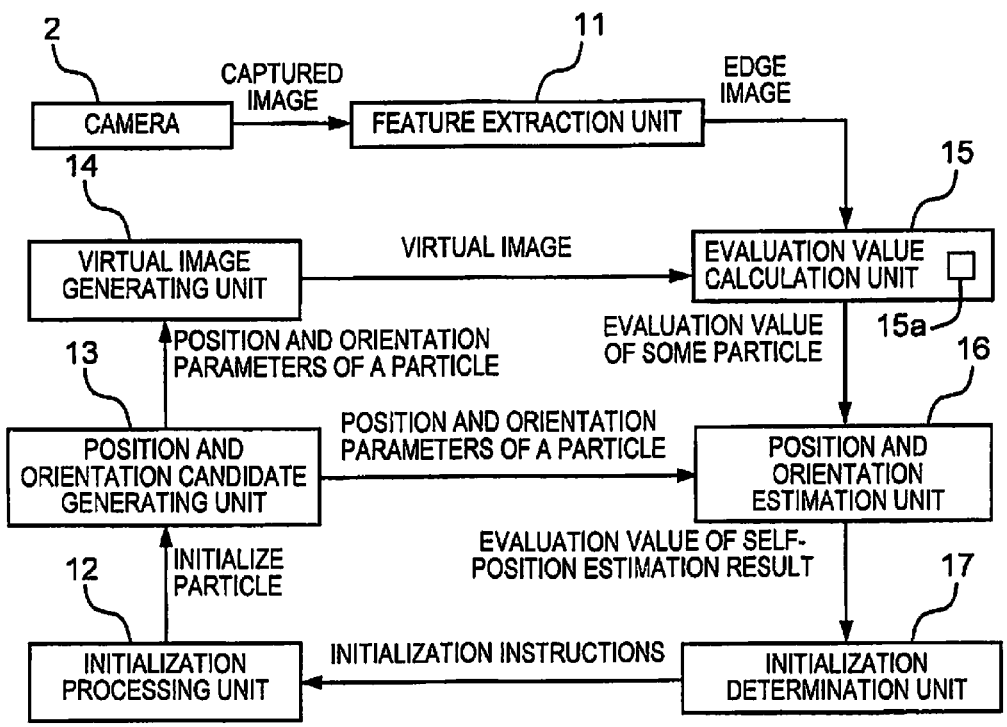
FIG. 2 is a Control block diagram of a self-position estimation in the computer 3 of the first embodiment.

FIG. 2 is a control block view of the self-position estimation in the computer 3 of the first embodiment. The lens of the camera 2 is a common lens with no distortion, but, for example, can be a fish-eye lens to capture a wide range. In the latter case, the self-position of the vehicle can be estimated by the same framework by setting the camera model used in the virtual image generating unit 14 described below to be a fish-eye camera. Additionally, if a fish-eye lens is mounted in order to capture a wider range around the vehicle, multiple cameras may be mounted to the car.

A feature extraction unit (edge image generating means) 11 extracts edges from the image captured by the camera 2 and generates an edge image. A known method for detecting an edge, such as the Canny method, can be used to extract the edge. Of course, depending on the problem, being able to detect the edge with a method such as the Sobel filter is adequate, and, in short, being able to observe an edge in the image that is sufficiently accurate for matching a parameter of a certain given position and orientation from the map data and a virtual image generated from the model of the camera 2, is adequate.

An initialization processing unit 12 carries out an Initialization step of a particle filter used to estimate the position and orientation of the vehicle. In the first embodiment, an initialization of the (position and orientation) parameters of the particles within the expected range of the position and orientation of the vehicle is carried out. Here, since the problem is to estimate the position and orientation of a vehicle within a limited section, the total number of degrees of freedom shall be six, which are the three degrees of freedom (x, y, z) representing the vehicle position and the three degrees of freedom (yaw, pitch, roll) representing the vehicle orientation (refer to FIG. 3). In the case of the first embodiment in which the self-position is estimated using a map data, a rough position range may be set using a GPS in order to set the range for initialization. Additionally, the number of particles need to be set at this time, which may be set to an appropriate number according to the problem. Since the particle filter is a known method, details are omitted.

Figure 3:
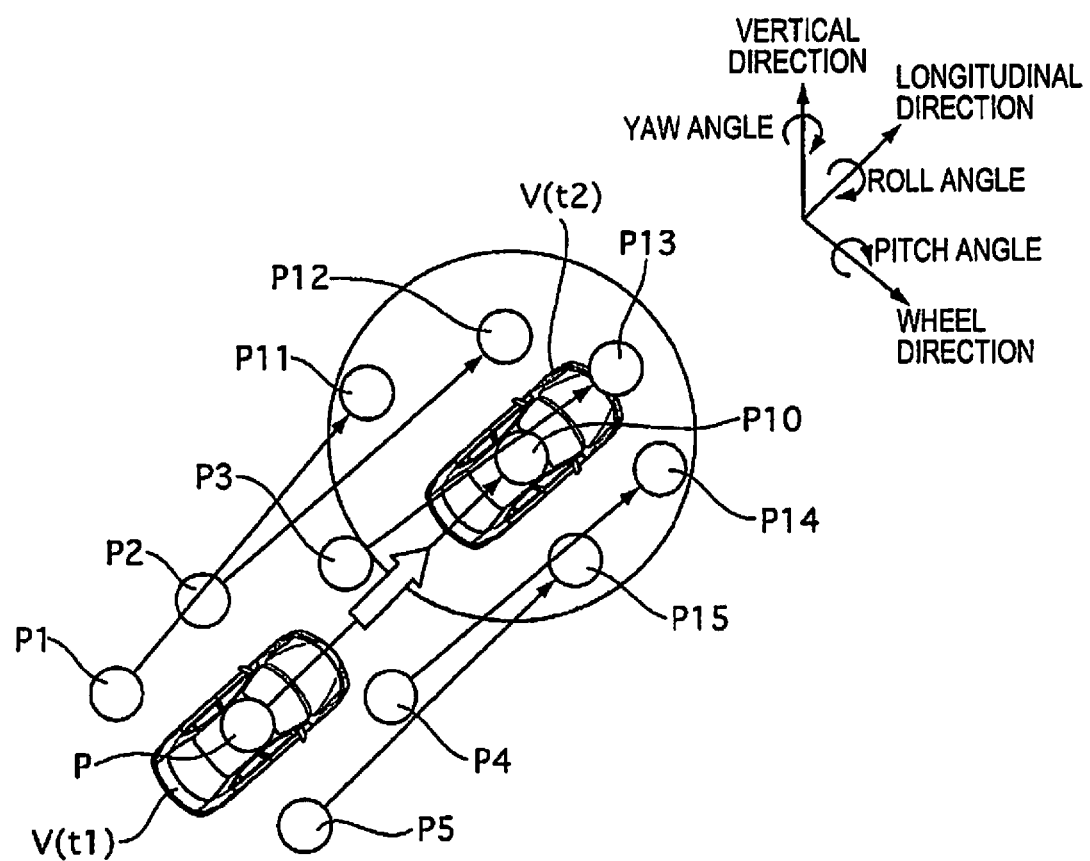
FIG. 3 is an explanatory view illustrating the dispersal method of particles by the moving body position estimation device of the first embodiment.

A position and orientation candidate generating unit 13 sets a parameter of the particles of the current moment from the position and orientation parameter of the particles of a single moment prior, using a vehicle system model set in advance (immediately after exiting the Initialization processing unit, the parameter of the current moment is set from the initialized value). The above framework is in the category of particle filters, so the details are omitted, but in the first embodiment, the system model shall be a random walk (The vehicle movement is randomly assumed within a predetermined range.). Of course, according to the problem, the system model may be a constant velocity linear motion model, or the like. For example, as illustrated in FIG. 3, the particle P and the surrounding particles P1-P5 of the position and orientation angle of the vehicle V (t1) estimated one loop prior is moved by the amount of the odometer, and the existence distribution range of the particles is set and amended. Then, particles P10-P15 are set to estimate a new position and orientation angle of the vehicle V (t2).

A virtual image generating unit (virtual image generating means) 14, references the storage unit 4, and generates a virtual image using the position and orientation parameters set to some particles at the previously described position and orientation candidate generating unit 13 and the camera model of the camera 2. In general, if the position and orientation parameters of the vehicle is given, the camera model of the camera 2 is known (measuring in advance suffices; alternatively, a design value suffices), and the three dimensional data of the storage unit 4 is known, the three dimensional map data can be converted to a two dimensional image (referred to as virtual image).

In the first embodiment, matching between an edge of the virtual image generated by the virtual image generating unit 14 in an evaluation value calculation unit 15 that will be described below and an edge in the extracted image extracted by the feature extraction unit 11 from the image captured by the camera 2 is carried out. Therefore, in the virtual image generating unit 14, projecting only the edge information of the three dimensional map corresponding to the component that is extracted as an edge from the captured image by the feature extraction unit 11 is sufficient. Specifically, projecting only the edge portion of buildings in the map, white lines on the road surface, and the like, is sufficient, and the projecting of information such as the texture or color of the buildings and the road surface is not required. As has been described above, the number of particles may be set according to the problem in the previously described position and orientation candidate generating unit 13, but if 100 particles were to be generated, the steps would be repeated 100 times.

The evaluation value calculation unit (evaluation value calculation means) 15 carries out the matching between the edge image outputted from the feature extraction unit 11 and the edge component of the virtual image outputted from the virtual image generating unit 14 to evaluate the degree of overlapping between the two, in which a higher evaluation value (likelihood) e is calculated, as the degree of overlapping is increased. In the conventional evaluation value calculation method, if two images are scanned and both pixels of interest $(x_i, y_i)$ have an edge, an evaluation value is added ($Eval(x_i, y_i)=1$), and if not, the value is not added ($Eval(x_i, y_i)=0$), thus being set so that the evaluation value is increased as overlapping is increased, whereas, in the first embodiment, the aim is to improve the accuracy and stabilization of the position and orientation estimation method that uses a particle filter, and when the evaluation value is calculated, even if the edges do not overlap, if the distance between the closest edges (edge-to-edge distance) is close (less than or equal to a predetermined distance), an evaluation correction value corresponding to the closeness of the two edges is added. The calculating of the evaluation correction value is carried out by an evaluation correction value calculation unit 15a in the evaluation value calculation unit 15.

Figure 4A:
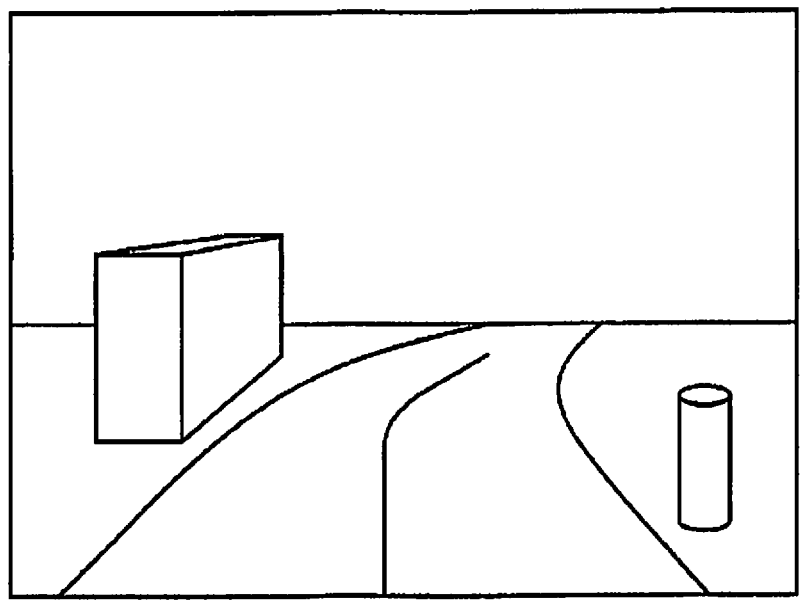
FIGS. 4A and 4B are explanatory views illustrating the calculation method for the evaluation correction value corresponding to the number of pixels of the first embodiment.
Figure 4B:
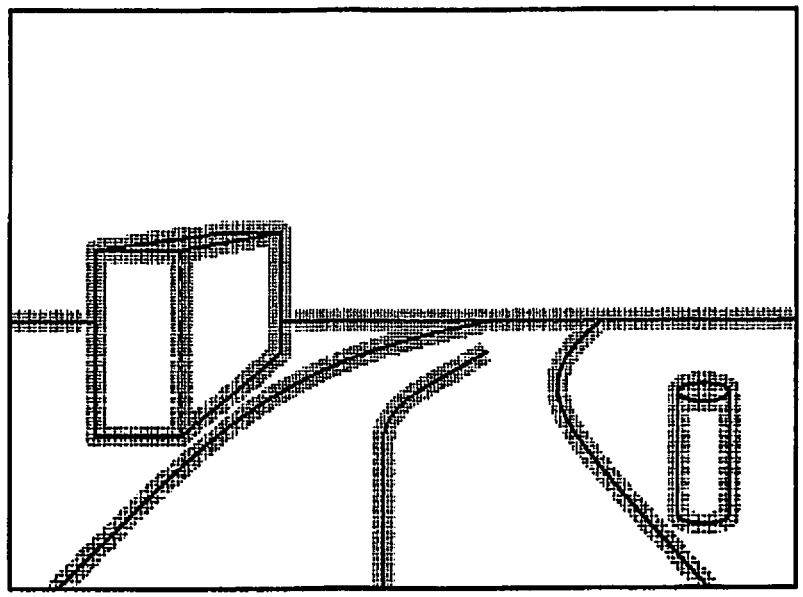

The evaluation correction value can be set in accordance with the number of pixels (number of pixels) between the edge in the virtual image and the edge in the edge image. For example, with respect to the edge in the virtual image, the evaluation correction value $ep(x_i, y_i)$ corresponding to the number of pixels of the pixel $(x_i, y_i)$ in the edge image that is shifted one or two pixels is set to 0.5, the evaluation correction value $ep(x_i, y_i)$ corresponding to the number of pixels of the pixel $(x_i, y_i)$ that is shifted three or four pixels is set to 0.25, and the evaluation correction value $ep(x_i, y_i)$ corresponding to the number of pixels of the pixel $(x_i, y_i)$ that is shifted five or more pixels is set to 0.0. Namely, in a virtual image such as that of FIG. 4A, by providing an edge vicinity region of four pixels on both sides of the edge, as illustrated in FIG. 4B, the edge width in the virtual image is virtually thickened, and when the edge in the edge image overlaps with the edge vicinity region, an evaluation correction value $ep(x_i, y_i)$ corresponding to the edge-to-edge distance is given.

Figure 5A:
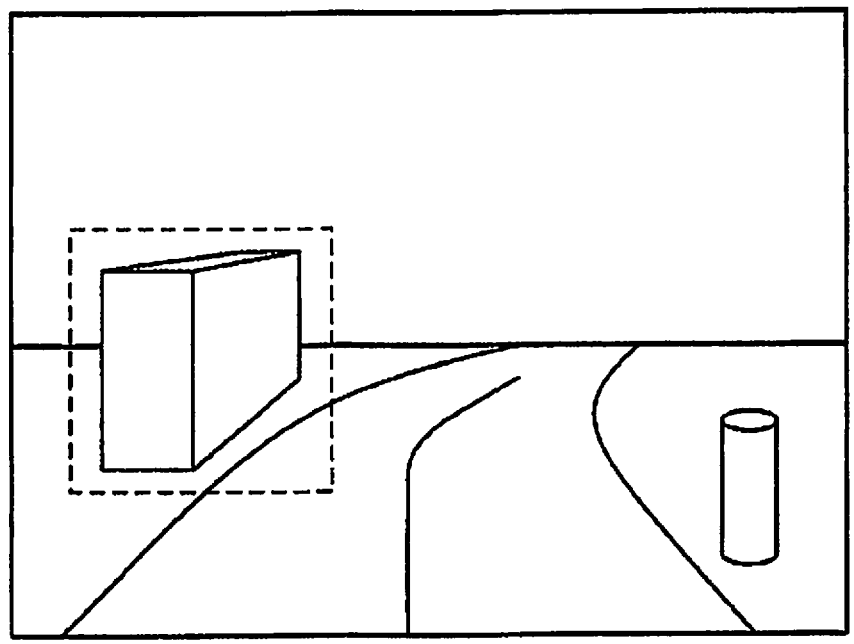
FIGS. 5A and 5B are explanatory views illustrating the calculation method for the evaluation correction value corresponding to the actual distance of the first embodiment.
Figure 5B:
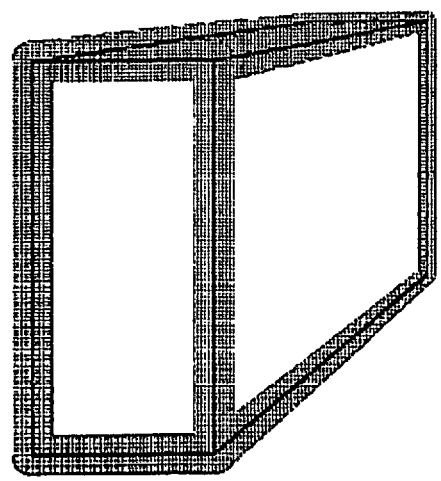

As another example, the evaluation correction value may be calculated using the three dimensional distance in real space, and not simply the number of pixels. When the predetermined distance is defined based on the number of pixels as described above, the distance in real space corresponding to one pixel varies in accordance with the distance of depth from the vehicle, namely, because the vertical and horizontal resolutions per pixel differ between a three-dimensional object positioned in the front and a three-dimensional object positioned in the rear. For example, in the virtual image illustrated in FIG. 5A, the three-dimensional object enclosed with the dashed line is the same size on the front surface and the back surface in real space, but the size thereof projected on the virtual image changes in accordance with the depth. Therefore, when reflecting real space, in the same manner as the method in the virtual image generating unit 14, using a map data whose three dimensional information is known, as illustrated in FIG. 5B, an edge vicinity region is provided taking into account the real distance, and an evaluation correction value $ed(x_i, y_i)$ corresponding to the real distance is obtained. The evaluation correction value $ed(x_i, y_i)$ corresponding to the real distance is obtained from the following formula.

$$ed(x_i, y_i)=1/(1+\text{alpha} \times d(x_i, y_i))$$

Here, alpha is an adjustment parameter, and $d(x_i, y_i)$ is the shortest distance from the edge of when the coordinate $(x_i, y_i)$ is three dimensionally projected. When the above distance is equal to or greater than a predetermined value (the edge is far), $ed(x_i, y_i)$ may be set to zero. In the evaluation correction value calculation unit 15a, the above steps are repeated as many times as the number of particles set in the position and orientation candidate generating unit 13.

The evaluation value calculation unit 15 calculates the evaluation value for each pixel based on the following formula.

(i) When an evaluation correction value $ep(x_i, y_i)$ corresponding to the number of pixels is set $$e = \Sigma(\text{Eval}(x_i, y_i) + ep(x_i, y_i))$$

Eval($x_i$, $y_i$)=1 (edges overlap)
Eval($x_i$, $y_i$)=0 (edges do not overlap (otherwise))

(ii) When an evaluation correction value $ed(x_i, y_i)$ corresponding to the real distance is set $$e = \Sigma(\text{Eval}(x_i, y_i) + ed(x_i, y_i))$$

Eval($x_i$, $y_i$)=1 (edges overlap)
Eval($x_i$, $y_i$)=0 (edges do not overlap (otherwise))

Accordingly, when an evaluation correction value $ep(x_i, y_i)$ corresponding to the number of pixels is set, for the portions where the number of pixels between the edge in the virtual image and the edge in the edge image is up to two pixels, one half of the original points are added, and for the portions up to four pixels, one quarter of the original points are added. On the other hand, when an evaluation correction value $ed(x_i, y_i)$ corresponding to the real distance is set, if the reciprocal of the distance is added at the time of adding, a higher value will be added, as the distance between the edge in the virtual image and the edge in the edge image is decreased. In the evaluation value calculation unit 15 also, in the same manner, the steps should be repeated as many times as the number of particles set in the position and orientation candidate generating unit 13. In the above example, the evaluation correction value is calculated in accordance with the number of pixels or the real distance between the edge in the virtual image and the edge in the edge image, with the edge in the virtual image as a reference, but the same results will be obtained even if the evaluation correction value is calculated in accordance with the number of pixels or the real distance between the edge in the edge image and the edge in the virtual image, with the edge in the edge image as a reference.

A position and orientation estimation unit (position estimation means) 16 estimates the position and orientation of a vehicle based on the evaluation value for each particle set in the evaluation value calculation unit 15. The step itself is a framework of a particle filter, but a larger weighting is set as the evaluation value is increased. For example, a predicted position and an orientation angle candidate with the highest likelihood is calculated as the actual position and orientation of the vehicle. Additionally, the likelihood of each predicted position and orientation angle candidate is used to obtain the weighted average of the predicted positions and orientation angles, and the obtained value may be set as the final position and orientation angle of the vehicle. In the position and orientation estimation unit 16, the position and orientation is estimated in the framework of a particle filter, and an evaluation value at the estimated parameters (position and orientation) is calculated (As a step, the position and orientation candidate generating unit 13 and the evaluation value calculation unit 15 are executed. In the steps described so far, the above series of flow needs to be executed as many times as the number of particles, but, here, only the flow for one parameter of the estimation result will be executed). The above evaluation value is outputted to an initialization determination unit 17 in a subsequent step, and is used for an Initialization step of when the estimation is wrong.

The initialization determination unit 17 determines whether or not the estimated position and orientation are errant detections. If a determination of an errant detection is made, an initialization order is sent to the Initialization processing unit 12, and the steps are executed again. As a determination method, when the evaluation value based on the estimation result outputted from the position and orientation estimation unit 16 is lower than a threshold set in advance, a determination of an errant detection is made.

Overall Steps

Figure 6:
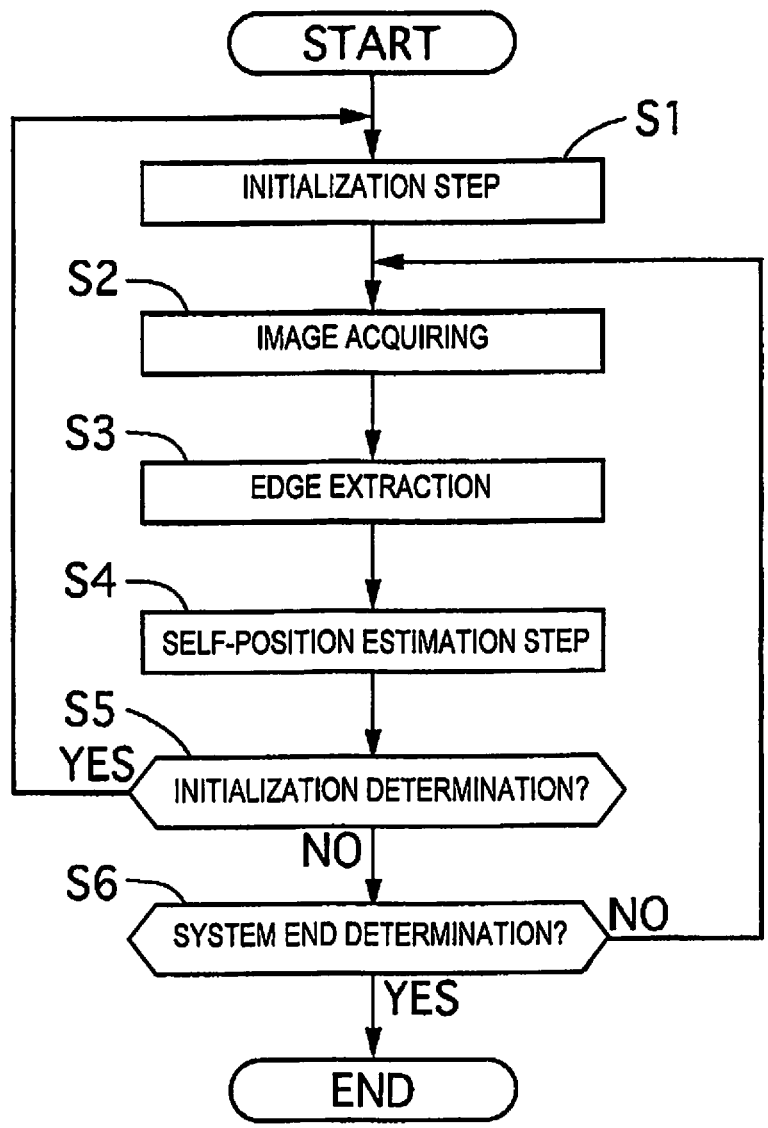
FIG. 6 is a flowchart illustrating the flow of the steps of the computer 3 of the first embodiment.

FIG. 6 is a flowchart illustrating the flow of the entire steps of the computer 3 of the first embodiment. In Step S1, an Initialization step of the particle filter is carried out in the Initialization processing unit 12. The above steps suffice to be executed once at the time of activating the system. However, in Step S5, if a reinitialization is determined to be required in the initialization determination unit 17, the particles are initialized again. In Step S2, an image forward of the vehicle is captured by the camera 2. In Step S3, edges are extracted from the image acquired with the camera 2 in the feature extraction unit 11.

In Step S4, a self-position estimation step is carried out. Details will be described below. In Step S5, whether or not the estimated position and orientation is an errant detection, such that an initialization is required again, is determined, in the initialization determination unit 17. If YES, the steps proceed to Step S1, and if NO, the steps proceed to Step S6. In Step S6, whether or not a system off has been inputted with the hands of the user is determined; if YES, the steps are ended, and if NO, the steps proceed to Step S2.

Self-Position Estimation Steps

Figure 7:
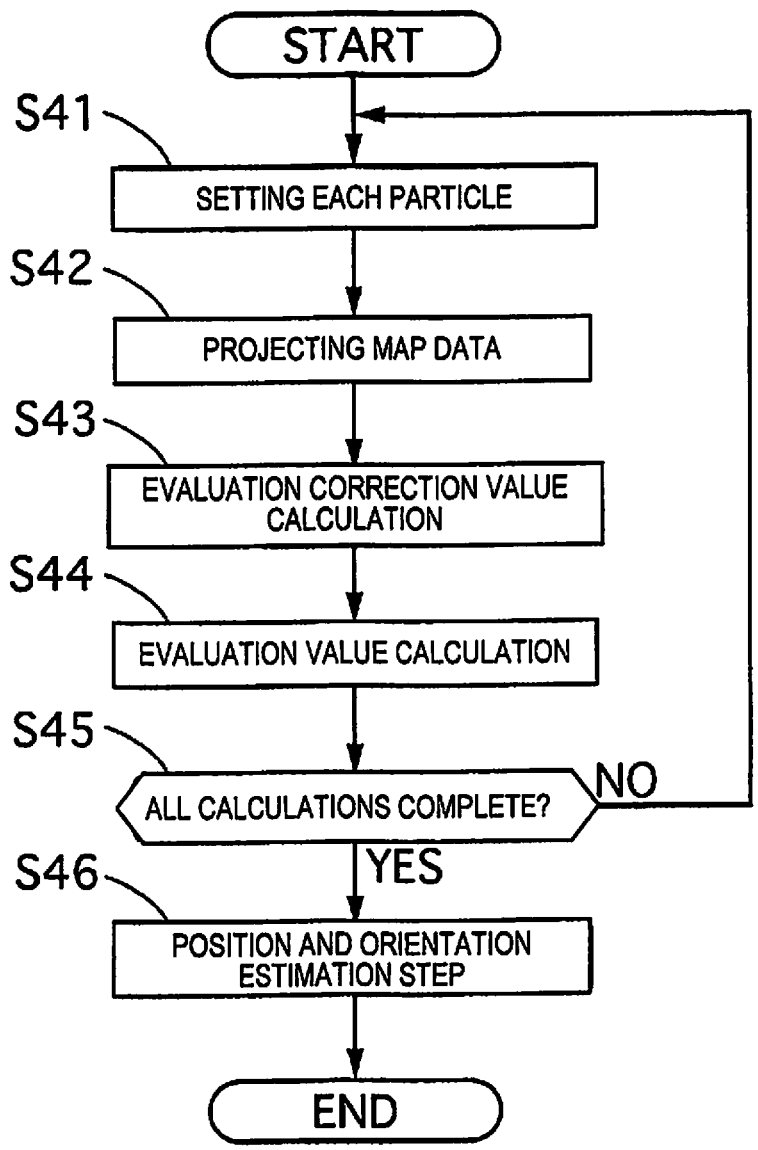
FIG. 7 is a flowchart illustrating the flow of the self-position estimation steps of the first embodiment.

FIG. 7 is a flowchart illustrating the flow of the self-position estimation steps of the first embodiment. In Step S41, in the position and orientation candidate generating unit 13, a parameter of the particles of the current moment (the six degrees of freedom of position and orientation) is set from the position and orientation parameter of the particles of a single moment prior, using a vehicle system model set in advance. In Step S42, in the virtual image generating unit 14, a virtual image is generated based on the position and orientation parameters set to the particle. In Step S43, in the evaluation correction value calculation unit 15a of the evaluation value calculation unit 15, an evaluation correction value (ep or ed) corresponding to the shift amount (number of pixels or real distance) between the edge in the edge image and the edge in the virtual image is calculated.

In Step S44, in the evaluation value calculation unit 15, the degree of overlapping between the edge image and the virtual image is evaluated. At this time, the evaluation value is calculated, taking into account the evaluation correction value (ep or ed). In Step S45, in the evaluation value calculation unit 15, whether or not the evaluation value calculation is completed for all the particles generated at the Initialization processing unit 12 is determined; if YES, the steps proceed to Step S46, and if NO, the process proceeds to Step S41. In Step S46, in the position and orientation estimation unit 16, weighting for the evaluation value of each particle is calculated, and the position and orientation of the current moment is estimated.

Figure 8A:
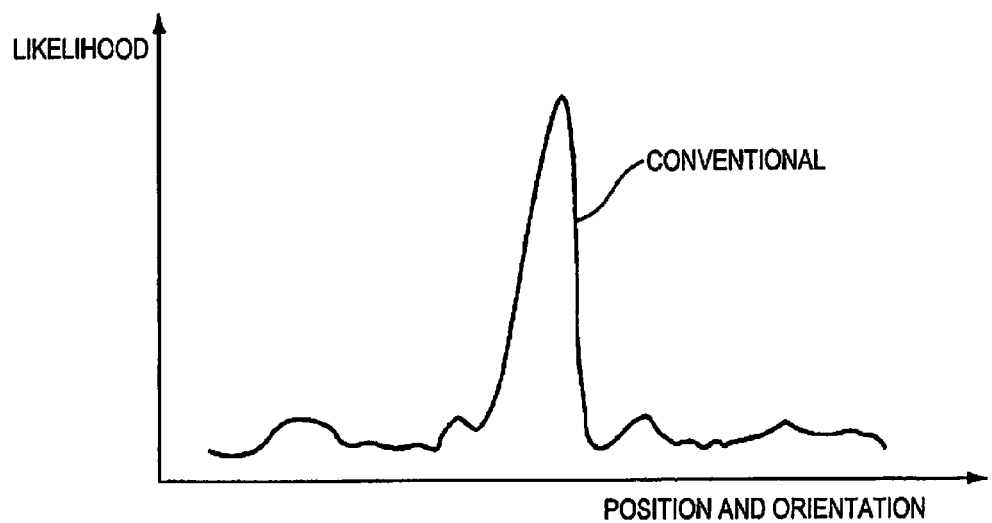
FIGS. 8A and 8B are diagrams illustrating the self-position estimation effect of the first embodiment.

Next, the effects will be described. In the conventional moving body position estimation device, even if the parameter of the particle is close to the true position of the host vehicle, if the parameter of the position is even slightly shifted from the true position and orientation, there is the problem that the likelihood of the particle is extremely reduced, causing the estimation of the position and orientation of the host vehicle to become unstable, as illustrated in FIG. 8A.

Figure 8B:
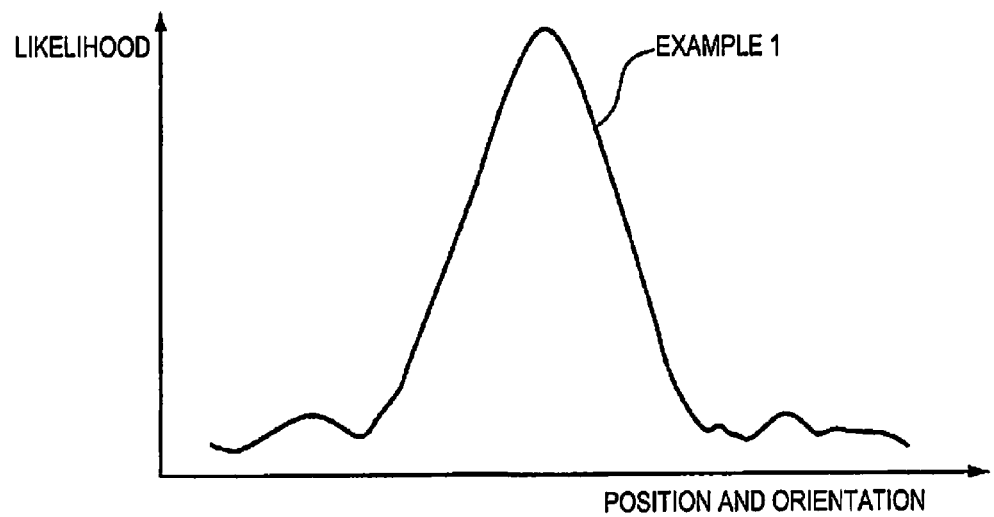

In contrast, in the first embodiment, the likelihood (evaluation value) is increased, as the number of pixels for which an edge-to-edge distance, which is the distance between an edge in the edge image and an edge in the virtual image, is less than or equal to a prescribed value is increased. Accordingly, as illustrated in FIG. 8B, an extreme decrease of likelihood can be suppressed, for particles with a small shift amount of the position and orientation parameters with respect to the true position and orientation of the host vehicle. In other words, even if a small shifting occurs between the position and orientation parameters of the particles and the true position and orientation of the host vehicle, a likelihood is given, and therefore a position and orientation close to the true position and orientation of the host vehicle can be estimated. Therefore, the position and orientation of the host vehicle can be safely estimated.

In the first embodiment, when the edge-to-edge distance is less than or equal to a predetermined distance, the likelihood is increased as the edge-to-edge distance is decreased. Accordingly, since the likelihood of the particles with a smaller shift amount of the position and orientation parameters with respect to the true position and orientation of the host vehicle are increased, the region close to the true position and orientation in the likelihood distribution of the parameter space can be densified. Therefore, a more adequate likelihood can be obtained, and the accuracy and stability of the position and orientation estimation can be improved.

In the first embodiment, the predetermined distance is the predetermined number of pixels. Accordingly, the range in which to increase the evaluation value can be set to a number of pixels that the designer sets in advance. Therefore, the range of the number of pixels from the edge in which the likelihood of the particle is evaluated higher can be set in accordance with the problem.

In the first embodiment, the predetermined distance is the three dimensional distance in real space. Accordingly, the range in which to increase the evaluation value can be set to distance in real space that the designer sets in advance. Therefore, the range of the distance in real space from the edge in which the likelihood of the particle is evaluated higher can be set in accordance with the problem.

The first embodiment exerts the effects listed below.

(1) The device comprises: a camera 2 which captures forward of the host vehicle to acquire a captured image, a feature extraction unit 11 which extracts an edge from the captured image to generate an edge image, a storage unit 4 for storing a map data comprising edge information and position information of structures existing in the host vehicle surroundings, a virtual image generating unit 14 that sets multiple particles which are assumed positions and orientations of the host vehicle, and converts the edge information of the map data for each particle to a virtual image captured from the assumed position and orientation, an evaluation value calculation unit 15 which compares the edge image and virtual image for each particle, and assigns a higher evaluation value if there are more overlapping edges between the images, and, assigns a higher evaluation value if there are more edges that are not overlapping edges and for which an edge-to-edge distance, which is the distance between an edge in the edge image and an edge in the virtual image, is less than or equal to a predetermined value, and a position and orientation estimation unit 16 which estimates the position of the host vehicle based on the evaluation value for each particle. Therefore, the position and orientation of the host vehicle can be safely estimated.

(2) The evaluation value calculation unit 15, when the edge-to-edge distance is less than or equal to a predetermined distance, increases the estimation value, as the edge-to-edge distance is decreased. Therefore, a more adequate likelihood can be obtained, and the accuracy and stability of the position and orientation estimation of the host vehicle can be improved.

(3) The predetermined distance is the predetermined number of pixels. Therefore, the range of the number of pixels from the edge in which the likelihood of the particle is evaluated higher can be set in accordance with the problem.

(4) The predetermined distance is the three dimensional distance in real space. Therefore, the range of the distance in real space from the edge in which the likelihood of the particle is evaluated higher can be set in accordance with the problem.

(5) The device captures forward of the host vehicle to acquire a captured image, extracts an edge from the captured image to generate an edge image, sets multiple particles which are assumed positions and orientations of the host vehicle, converts the edge information of a map data comprising edge information and position information of structures existing in the host vehicle surroundings for each particle to a virtual image captured from the assumed position and orientation, compares the edge image and virtual image for each particle, assigns a higher evaluation value if there are more overlapping edges between the images, and, assigns a higher evaluation value if there are more edges that are not overlapping edges and for which an edge-to-edge distance, which is the distance between an edge in the edge image and an edge in the virtual image, is less than or equal to a predetermined value, and estimates the position of the host vehicle based on the evaluation value for each particle. Therefore, the position and orientation of the host vehicle can be safely estimated.

Second Embodiment

Next, the moving body position estimation device according to the second embodiment will be described with reference to the drawings. FIG. 9 is an explanatory view illustrating the calculation method of the evaluation correction value corresponding to the edge density. Meanwhile, the other configurations are the same as the first embodiment, thus, are given the same codes, and the descriptions thereof are omitted.

Figure 9A:
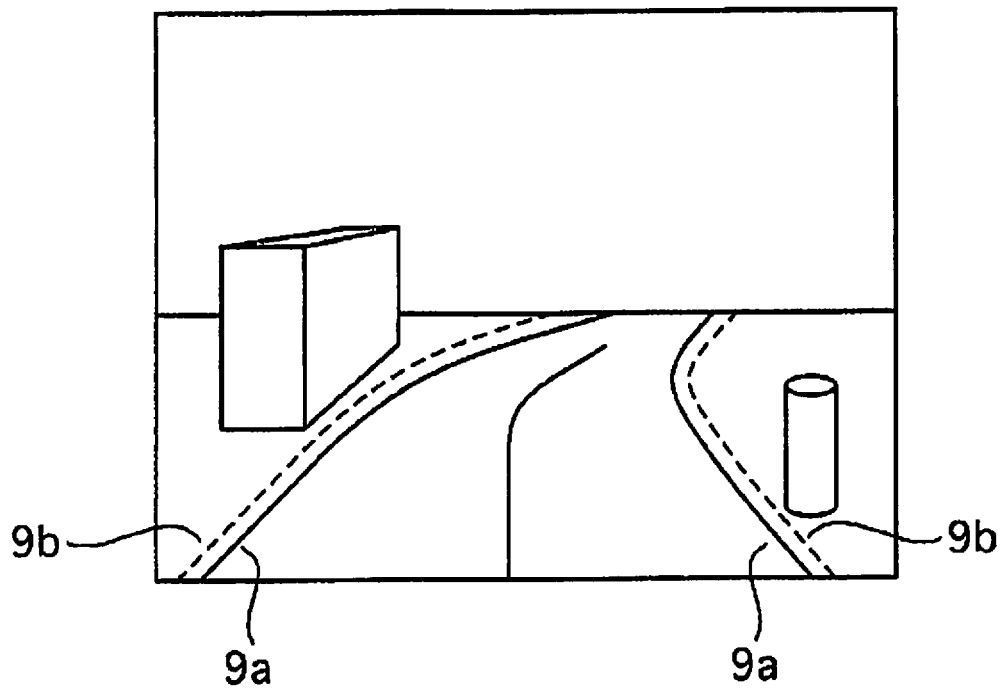
FIGS. 9A and 9B are an explanatory views illustrating the calculation method of the evaluation correction value corresponding to the edge density of the second embodiment.

FIG. 9A is an edge image generated by extracting an edge from an image captured by the camera 2, in the feature extraction unit (edge image generating means) 11. In the edge image shown in FIG. 9A, since a shoulder 9b exists in the vicinity parallel to a lane 9a, due to the position and orientation of the particle, the edge of the lane in the virtual image and the edge of the shoulder 9b in the edge image become a close state (a state in which the edge density is high), and the evaluation value is partially increased. Thus, in the second embodiment, when the distance between the closest edges (edge-to-edge distance) is close (less than or equal to a predetermined distance), in a region where the edge density of the edge image is high, the predetermined distance for determination is decreased.

Figure 9B:
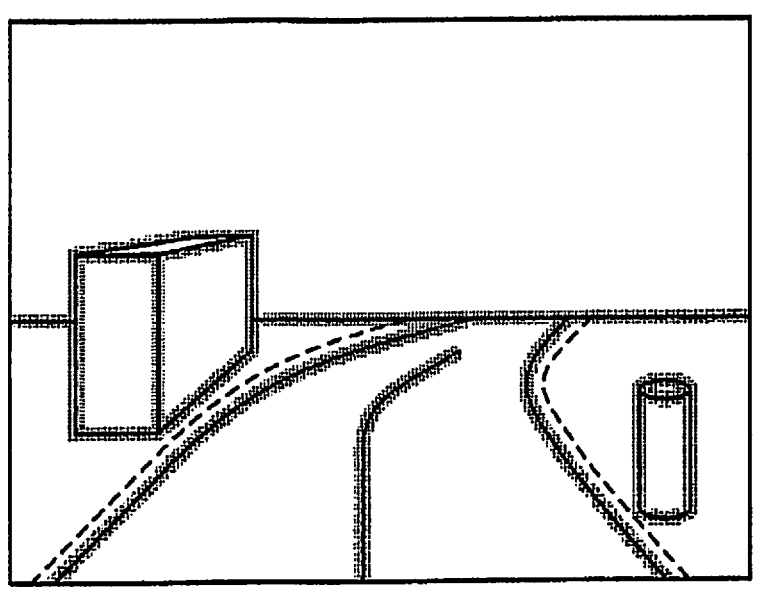

For example, in a region where the edge density of the edge image is low, as in the first embodiment, with respect to the edges in the virtual image, the evaluation correction value $ep(x_i, y_i)$ corresponding to the number of pixels of the pixel $(x_i, y_i)$ in the edge image that is shifted one or two pixels is set to 0.5, the evaluation correction value $ep(x_i, y_i)$ corresponding to the number of pixels of the pixel $(x_i, y_i)$ that is shifted three or four pixels is set to 0.25, and the evaluation correction value $ep(x_i, y_i)$ corresponding to the number of pixels of the pixel $(x_i, y_i)$ that is shifted five or more pixels is set to 0.0. On the other hand, in a region where the edge density of the edge image is high, with respect to the edge in the virtual image, the evaluation correction value $ep(x_i, y_i)$ corresponding to the number of pixels of the pixel $(x_i, y_i)$ in the edge image that is shifted one pixel is set to 0.5, the evaluation correction value $ep(x_i, y_i)$ corresponding to the number of pixels of the pixel $(x_i, y_i)$ that is shifted two pixels is set to 0.25, and the evaluation correction value $ep(x_i, y_i)$ corresponding to the number of pixels of the pixel $(x_i, y_i)$ that is shifted 3 or more pixels is set to 0.0. Namely, in an edge image such as that of FIG. 9A, by providing an edge vicinity region of two pixels on both sides of the edge of the lane 9a, which is a region where the edge density of the edge image is high, as illustrated in FIG. 9B, the edge vicinity region can be narrowed compared to other regions, and the increasing of the evaluation correction value due to the edge of the shoulder 9b can be suppressed.

The second embodiment exerts the following effects, in addition to the effects 1-5 of the first embodiment.

(6) The evaluation value calculation unit 15 decreases the predetermined distance, as the edge density of the edge image is increased. Therefore, the erroneous increasing of the evaluation correction value in regions where the edge density is high can be suppressed, and the accuracy and stability of the position and orientation estimation of the host vehicle can be improved.

OTHER EMBODIMENTS

A preferred embodiment of the present invention was described above based on one embodiment, but specific configurations of the present invention are not limited by the embodiment, and changes to the design made without departing from the scope of the invention are also included in the present invention. For example, in the embodiment, an evaluation function is set (maximization problem) so that the evaluation value increases, as the amount of the edges overlapping between the edge image and the edge in the virtual image is increased, but the evaluation function may be set so that error is reduced, as the amount of the edges overlapping is increased (minimization problem).

The present invention is applicable to the estimation of the relative position (lateral position) of a vehicle, with respect to the left and right white lines of the traveling path. In this case, the position and orientation parameters are, the one degree of freedom of the lateral position as the position parameter, and the two degrees of freedom of the pitch and yaw as the orientation parameter; a total of three degrees of freedom. Meanwhile, since the width of white lines vary from place to place, the width of white lines may be added as an estimation parameter.

The invention claimed is:
1. A moving body position estimation device comprising:
a camera configured to capture surroundings of a moving body to acquire a captured image;
a storage configured to store a map data comprising edge information and position information of structures existing in the surroundings of the moving body;
a computer programmed to include
an edge image generating unit which extracts an edge from the captured image to generate an edge image;
a virtual image generating unit that sets multiple particles which are assumed positions and orientations of the moving body and converts the edge information of the map data for each of the particles to a virtual image captured from the assumed position and orientation;
an evaluation value calculation unit which compares the edge image and the virtual image for each of the particles, and assigns a higher evaluation value upon determining there are more overlapping edges between the edge and virtual images, and assigns a higher evaluation value upon determining there are more edges for which an edge-to-edge distance of when an edge in the edge image and an edge in the virtual image are three-dimensionally projected onto real space is less than or equal to a predetermined distance on an image that reflects a three-dimensional distance in real space with respect to edges that are not overlapping;
a position and orientation estimation unit which estimates a position of the moving body based on the evaluation value for each of the particles.
2. A moving body position estimation device comprising:
a camera configured to capture surroundings of a moving body to acquire a captured image;
a storage configured to store a map data comprising edge information and position information of structures existing in the surroundings of the moving body;
a computer programmed to include
an edge image generating unit which extracts an edge from the captured image to generate an edge image;
a virtual image generating unit that sets multiple particles which are assumed positions and orientations of the moving body and converts the edge information of the map data for each of the particles to a virtual image captured from the assumed positions and orientations;
an evaluation value calculation unit which compares the edge image and the virtual image for each of the particles, and assigns a higher evaluation value upon determining there are more overlapping edges between the images, and assigns a higher evaluation value upon determining there are more edges that are not overlapping edges and for which an edge-to-edge distance is less than or equal to a predetermined distance, where the edge-to-edge distance is a distance between an edge in the edge image and an edge in the virtual image;
a position and orientation estimation unit which estimates a position of the moving body based on the evaluation value for each of the particles,
the evaluation value calculation unit reducing the predetermined distance as an edge density of the edge image increases.
3. The moving body position estimation device according to claim 2, wherein
the evaluation value calculation unit increases the evaluation value as the edge-to-edge distance decreases, when the edge-to-edge distance is less than or equal to the-predetermined distance.
4. The moving body position estimation device according to claim 2, wherein
the predetermined distance is a predetermined number of pixels.

5. The moving body position estimation device according to claim 3, wherein
the predetermined distance is a predetermined number of pixels.

6. A moving body position estimation method comprising:
capturing surroundings of a moving body to acquire a captured image;
extracting an edge from the captured image to generate an edge image;
setting multiple particles, which are assumed positions and orientations of the moving body, and converting edge information of map data for each of the particles to a virtual image captured from the assumed position and orientation;
comparing the edge image and the virtual image for each of the particles, and assigning a higher evaluation value upon determining there are more overlapping edges between the images, and assigning a higher evaluation value upon determining there are more edges that are not overlapping edges and for which an edge-to-edge distance is less than or equal to a predetermined distance, the distance being between an edge in the edge image and an edge in the virtual image;
the position of the moving body being estimated based on the evaluation value for each particle; and
reducing the predetermined distance as an edge density of the edge image is increased.

7. A moving body position estimation method comprising:
capturing surroundings of a moving body to acquire a captured image;
extracting an edge from the captured image to generate an edge image;
storing a map data comprising edge information and position information of structures existing in the surroundings of the moving body;
setting multiple particles which are assumed positions and orientations of the moving body and converting edge information of map data for each of the particles to a virtual image captured from the assumed position and orientation;
comparing the edge image and the virtual image for each particle, and assigning a higher evaluation value upon determining there are more overlapping edges between the images, and assigning a higher evaluation value upon determining there are more edges for which an edge-to-edge distance of when an edge in the edge image and an edge in the virtual image are three-dimensionally projected onto real space is less than a predetermined distance in real space, with respect to edges that are not overlapping; and
the position of the moving body being estimated based on the evaluation value for each of the particles.

* * * * *